United States Patent [19]

Schulz et al.

[11] 4,258,173
[45] Mar. 24, 1981

[54] POLYPHOSPHAZENE POLYMERS CONTAINING MONOETHEROXY AND POLYETHEROXY SUBSTITUENTS

[75] Inventors: Donald N. Schulz, Hartville; Tai C. Cheng, Akron; Thomas A. Antkowiak, Rittman, all of Ohio

[73] Assignee: The Firestone Tire & Rubber Company, Akron, Ohio

[21] Appl. No.: 83,889

[22] Filed: Oct. 11, 1979

Related U.S. Application Data

[63] Continuation of Ser. No. 940,529, Sep. 8, 1978, abandoned.

[51] Int. Cl.$^3$ .................. C08G 73/00; C08G 79/02
[52] U.S. Cl. ................................ 528/168; 528/374; 528/399
[58] Field of Search ............... 528/168, 399, 392, 374

[56] References Cited

U.S. PATENT DOCUMENTS

| | | | |
|---|---|---|---|
| 3,370,020 | 2/1968 | Allcock et al. | 528/399 |
| 4,018,822 | 4/1977 | Sharma et al. | 260/551 P |
| 4,026,838 | 5/1977 | Dieck et al. | 528/168 |
| 4,055,520 | 10/1977 | Dieck et al. | 528/168 |
| 4,055,545 | 10/1977 | Dieck et al. | 528/168 |
| 4,061,606 | 12/1977 | Dieck et al. | 528/168 |
| 4,073,824 | 2/1978 | Dieck et al. | 528/168 |

*Primary Examiner*—Wilbert J. Briggs, Sr.

[57] ABSTRACT

Polyphosphazene polymers are prepared which contain repeating units represented by the formulas:

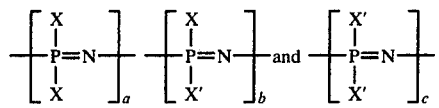

wherein X is R(OR')$_n$O— in which R is alkyl containing from 1 to 20 carbon atoms, aryl, alkylaryl or arylalkyl, R' is an alkylene radical and n is an integer from 1 to 70; wherein X' is X or is selected from the group consisting of substituted or unsubstituted alkoxy, alkenyloxy, aryloxy, alkenylaryloxy, amino and mercapto groups and wherein $20 \leq (a+b+c) \leq 50{,}000$ per polymer.

The polymers of the invention can be utilized to form films and may also be utilized in applications for moldings, coatings, foams and the like.

7 Claims, No Drawings

POLYPHOSPHAZENE POLYMERS CONTAINING MONOETHEROXY AND POLYETHEROXY SUBSTITUENTS

This is a continuation of application Ser. No. 940,529 filed Sept. 8, 1978, now abandoned.

BACKGROUND OF THE INVENTION

This invention relates to polyphosphazene homopolymers and copolymers containing repeating

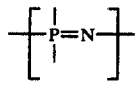

units in the polymer chain in which monoetheroxy and polyetheroxy substituents are attached to the phosphorus atom. More particularly, the invention relates to polyphosphazene homopolymers containing monoetheroxy or polyetheroxy substituents represented by the structure $R(OR')_nO—$ (defined below), and to copolymers containing such substituents along with substituted or unsubstituted alkoxy, alkenyloxy, aryloxy, alkenylaryloxy, amino and mercapto groups.

Polyphosphazene homo- and co- polymers containing repeating

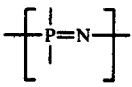

units in which various alkoxy, substituted alkoxy, aryloxy and substituted aryloxy groups are attached to the phosphorus atom and their method of preparation are described in the prior art as illustrated in the publication "Phosphorus-Nitrogen Compounds," Academic Press, New York, N.Y. 1972 by H. R. Allcock and "Poly(Organophosphazenes)," Chemtech, Sept. 19, 1975 by H. R. Allcock and in such U.S. Pat. Nos. as 3,515,688; 3,702,833; and 3,856,712.

However, none of the prior art of which applicants are aware, discloses or suggests polyphosphazene homopolymers and copolymers containing monoetheroxy and polyetheroxy substituents.

SUMMARY OF THE INVENTION

In accordance with this invention, polyphosphazene homopolymers and copolymers are prepared which contain monoetheroxy or polyetheroxy substituents.

The polyphosphazene polymers of this invention contain repeating units represented by the formulas:

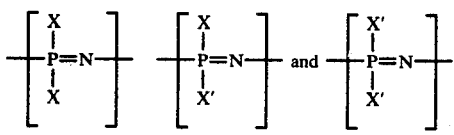

wherein X is $R(OR')_nO—$ in which R is alkyl containing 1 to 20 carbon atoms, aryl, alkylaryl or arylalkyl, R' is an alkylene radical and n is an integer from 1 to 70; wherein X' is X or is selected from the group consisting of substituted or unsubstituted alkoxy, alkenyloxy, aryloxy, alkenylaryloxy, amino or mercapto groups. The polymers may contain from 20 to 50,000 of such units.

As will be evident from the above formulas, in instances where X and X' are the same, homopolymers are formed whereas where X and X' are different, copolymers are formed.

In the copolymer units represented by the above formulas, all X substituent groups may be the same or they may be mixed and all X' substituent groups may be the same or mixed. In the mixtures, the X substitutent groups may be mixtures of different monoetheroxy or polyetheroxy substituent groups and the X' substituent groups may be mixtures of substituted or unsubstituted alkoxy, alkenyloxy, aryloxy, alkenylaryloxy, amino and mercaptan groups or mixtures of different groups within each class.

The specific proportion of X to X' substituent groups incorporated in the polymers of the invention may vary considerably depending upon chemical and physical properties desired in the polymer and the particular end use for which the polymer is intended. Thus, for applications such as moldings, coatings, foams and the like, the polymer should contain at least 10 mole percent by weight of the monoetheroxy or polyetheroxy substituent.

The polymers are preferably prepared by reacting a poly(dichlorophosphazene) having the formula $—(NPCl_2)_n—$, in which n is from 20 to 50,000, with an ether group-containing alcohol or a mixture of ether group-containing alcohols, aliphatic alcohols, aromatic alcohols, amino compound or mercaptan compound in the presence of a tertiary amine. In instances where it is desired to incorporate an alkenyloxy or alkenylaryloxy substituent into the polymer for crosslinking purposes, this can be accomplished by including an unsaturated aliphatic or aromatic alcohol in the mixture.

Alternatively, the polymers can be prepared utilizing the prior art sodium processes described in the aforementioned U.S. Pat. Nos. 3,515,688; 3,702,833; 3,856,712; and the Allcock articles, the disclosures of which are hereby incorporated herein by reference.

DETAILED DESCRIPTION OF THE INVENTION

The term "polymer" as employed hereinafter throughout this specification and claims is utilized in its broadest sense and includes polyphosphazene homopolymers, copolymers, terpolymers, tetrapolymers and the like.

The terms "monoetheroxy" and "polyetheroxy" as employed hereinafter throughout the specification and claims relates to ether group-containing oxy radicals represented by the formula $R(OR')_nO—$ wherein R and R' are as defined hereinafter and n is an integer from 1 to 70; more specifically the term "monoetheroxy" refers to oxy radicals in which n in the above formula is 1 and "polyetheroxy" refers to oxy radicals in which n in the above formula is 2 or more.

I. THE POLY(DICHLOROPHOSPHAZINE) POLYMER

Poly(dichlorophosphazene) polymers which are employed as starting materials in preparing the polymers of this invention are well known in the art as illustrated in U.S. Pat. Nos. 3,370,020; 4,005,171; and 4,055,520, the disclosures of which are incorporated herein by reference.

These polymers have the general formula $—(NPCl_2)_n—$, in which n may range from 20 to 50,000 or more.

As described in the aforementioned references, the polymers are in general prepared by the thermal polymerization of cyclic oligomers having the formula —(NPCl$_2$)$_n$—, in which n is an integer of from 3 to 7, with the cyclic trimer and tetramer often comprising up to 90% of the oligomers.

The specific conditions of temperature, pressure and time employed in the thermal polymerization of the cyclic oligomers can vary considerably depending on whether or not the polymerization is catalyzed. Thus, temperatures may range from about 130° C. to about 300° C., pressures may range from a vacuum of less than about 10$^{-1}$ Torr to superatmospheric and times may range from 30 minutes to about 48 hours.

A preferred process for preparing the poly(dichlorophosphazene) polymers used in the process of this invention is described in the aforementioned incorporated U.S. Pat. No. 4,005,171.

II. THE MONOETHEROXY AND POLYETHEROXY SUBSTITUENTS

As indicated above, the monoetheroxy and polyetheroxy substituents of the polymers of the invention are ether group-containing oxy radicals represented by the formula R(OR')$_n$O— in which R is alkyl containing from 1 to 20 carbon atoms, aryl, alkylaryl or arylalkyl, R' is an alkylene radical and n is an integer from 1 to 70. Preferred ether group-containing moieties represented by the above formula are those containing more than one (1) ether group. Thus, the preferred ether group-containing oxy radicals are polyetheroxy's in which n in the above formula is at least 2 and more preferably is from 3 to 15.

The presence of polyetheroxy substituents in the polymers of the invention provides for increased water dispersibility and solubility of the polymers. Thus, it has been found that as the number of ether groups in the polyetheroxy radical is increased, the water solubility or dispersibility of the polymer increased. Accordingly, the polymers of the invention should be attractive for use in aqueous polymer compositions for coating applications.

These monoetheroxy and polyetheroxy substituents are derived from ether alcohols having the formula R(OR')$_n$OH where R, R' and n are as defined above.

The monoetheroxy substituents may be derived from monoether alcohols such as 2-methoxyethanol, 3-methoxybutanol, 2-butoxyethanol and the like.

The polyetheroxy substituents may be derived from alkyl polyether alcohols such as 2-(2-ethoxyethoxy)-ethanol, 2-(2-butoxyethoxy)ethanol and the like; aryl polyether alcohols such as 2-(2-phenoxyethoxy)ethanol, 2-(2-phenoxyethoxy-2-ethoxy)ethanol and the like; alkylaryl polyether alcohols such as octylphenoxy polyether alcohols, nonylphenoxy polyether alcohols and the like commercially available under the designations Triton X-® and Triton® N- (e.g. Triton® X-35, X-100 etc.) from Rohm & Haas Co. and arylalkyl polyether alcohols such as 2-(2-benzylethoxy) ethanol and the like. The preferred polyetheroxy substituents herein are those derived from alkylaryl polyether alcohols.

III. THE ALKOXY, ALKENYLOXY, ARYLOXY, ALKENYLARYLOXY, AMINO AND MERCAPTO SUBSTITUENTS

As indicated heretofore, the polyphosphazene polymers of the invention in addition to the R(OR')$_n$O— substituent group may contain as the X' substituent substituted or unsubstituted alkoxy, alkenyloxy, aryloxy, alkenylaryloxy, amino or mercapto groups.

The alkoxy groups (substituted or unsubstituted) may be derived from aliphatic alcohols having from 1 to 20 carbon atoms such as methanol, ethanol, propanol, isopropanol, n-butanol, sec-butanol, hexane, dodecanol and the like; fluoroalcohols, especially those represented by the formula Z(CF$_2$)$_n$CH$_2$OH in which Z is hydrogen or fluorine and n is an integer from 1 to 10 as illustrated by trifluoroethanol, 2,2,3,3,3-pentafluoropropanol, 2,2,3,3,4,4,4-heptafluorobutanol; 2,2,3,3-tetrafluoropropanol; 2,2,3,3,4,4,5,5-octafluoropentanol; 2,2,3,3,4,4,5,5,6,6,7,7-dodecafluoroheptanol and the like. In instances where it is desired to incorporate mixed X' substituent groups in the copolymers, mixtures of the foregoing alcohols may be employed.

The aryloxy groups (substituted or unsubstituted) may be derived from aromatic alcohols including among others phenol; alkylphenols such as cresols, xylenols, p-, o-, and m-ethyl and propyl phenols and the like; halogen-substituted phenols such as p-, o-, and m-chloro and bromo phenols and di- or tri-halogen substituted phenols and the like; and alkoxy-substituted phenols such as 4-methoxyphenol, 4-(n-butoxy) phenol and the like. Mixtures of the foregoing aromatic alcohols may also be employed.

The amino groups may be derived from any of the amino compounds heretofore employed in the polyphosphazene polymer art. Thus, the amino groups may be derived from aliphatic primary and secondary amines such as methylamine, ethylamine, dimethylamine, ethylmethylamine and the like and aromatic amines such as those described in U.S. Pat. No. 4,042,561, incorporated herein by reference, as illustrated by aniline, halogen-substituted anilines, alkyl-substituted anilines, alkoxy-anilines, alkoxy-substituted anilines and the like.

The mercapto groups may be derived from any of the mercaptan compounds heretofore employed in the polyphosphazene polymer art. Thus, for example, the mercaptan compounds described in U.S. Pat. No. 3,974,242 to Lanier et al, incorporated herein by reference, may be utilized. Representative of suitable mercaptan compounds as described in the aforementioned patent are methyl mercaptan and its homologs ethyl, propyl, butyl, aryl and hexyl mercaptans, thiophenol, thionaphthols, benzyl mercaptan, cyclohexyl mercaptan and the like.

The alkenyloxy (i.e. oxy radicals of alkenyl compounds) and alkenylaryloxy (alkenyl-substituted aryloxy) groups are ethylenically unsaturated monovalent radicals which are capable of undergoing a crosslinking chemical reaction. Examples of such crosslinking moieties and methods for their cure are described in U.S. Pat. Nos. 3,702,833; 3,844,983; 3,888,799; 4,055,520; and 4,061,606 which are hereby incorporated by reference and include unsaturated monovalent radicals such as —OCH=CH$_2$; —ORCH=CH$_2$;

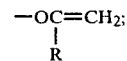

—ORCF=CF$_2$; —OCH$_2$RF=CF$_2$ and —OR'R$^2$ in which R is an aliphatic or aromatic radical, R' is alkylene or arylene and R$^2$ is vinyl, allyl, crotyl or the like. A preferred ethylenically unsaturated radical is orthoallylphenoxy.

The alkenyloxy groups may be derived from unsaturated aliphatic alcohols such as allyl alcohol, 3-butene-1-ol, 2,3,3-fluoropropen-1-ol and the like.

The alkenylaryloxy groups may be derived from unsaturated aromatic alcohols such as vinylphenols, allylphenols, eugenol, isoeugenol and the like.

In cases where it is desired to incorporate such cross-linking substituents in the polymers of the invention, there may be present in an amount between about 0.1 mole percent to about 55 mole percent and more commonly from about 0.5 mole percent to about 10 mole percent based on the replaceable chlorine in the starting poly(dichlorophosphazene).

The preferred substituent groups represented by X' for use in the polymers of the invention are alkoxy groups, especially fluoroalkoxy groups and aryloxy groups, especially phenoxy and O-allylphenoxy groups.

As mentioned heretofore, the polymers of the invention are preferably prepared by reacting the poly(dichlorophosphazene) polymer, the ether alcohol and if desired, other reactants (e.g. aliphatic or aromatic alcohol, amino compound, mercaptan compound etc.) in the presence of a tertiary amine.

IV. THE TERTIARY AMINE

The use of the tertiary amine in preparing the polymers of the invention minimizes undesirable side reactions and at the same time acts as an effective acid scavenger.

Tertiary amines which may be employed in preparing the polymers of the invention are those represented by the general structure:

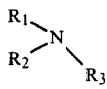

wherein $R_1$, $R_2$, and $R_3$ may each be alkyl containing from 1 to 8 carbon atoms. Thus, for example, the tertiary amine may be a trialkyl amine such as trimethylamine, triethylamine, tri-isopropylamine, tri-n-propylamine, triisobutylamine, tri-n-butylamine, and the like. In addition, tertiary amines such as pyridine, N,N,N',N'-tetramethylethylene diamine (TMEDA), dipipyridyl ethane, 1,4 diaza bicyclo (2.2.2) octane (DAMCO), N-methyl pyrolle and N-methyl morpholine can also be utilized.

The preferred tertiary amines for use in preparing the polymers of the invention are triethylamine, N,N,N',N'-tetramethylethylene diamine and pyridine.

The specific reaction conditions and proportion of ingredients employed in preparing these polymers can vary somewhat depending on factors such as the reactivity of the specific substituent or substituent mixture utilizes, the particular tertiary amine employed, and the degree of substitution desired in the finished polymer. In general, reaction temperatures may range from about 25° C. to about 200° C. and times may range from 3 hours up to 7 days; lower temperatures necessitating longer reaction times and higher temperatures allowing shorter reaction times. These conditions are, of course, utilized in order to obtain the most complete reaction possible, i.e., in order to insure substantially complete conversion of the chlorine atoms in the polymer to the corresponding ester of the substituent mixture.

The above reaction is ordinarily carried out in the presence of a solvent. The solvent or solvent mixture employed in the reaction should be a solvent for the poly(dichlorophosphazene) polymer, the substituent mixture and the tertiary amine.

In addition, the materials in the reaction zone should be reasonably free of water, most preferably containing 0.01 percent by weight of water or less. The prevention of water in the reaction system is necessary in order to inhibit the reaction of the available chlorine atoms in the chloropolymer therewith. Examples of suitable solvents which may be employed include diglyme, triglyme, tetraglyme, toluene, xylene, cyclohexane, chloroform, dioxane, dioxalene, methylene chloride, tetrachloroethane, and tetrahydrofuran. The amount of solvent or solvent mixture employed is not critical and any amount sufficient to solubilize the reaction mixture materials can be employed.

In general, the amount of the substituent mixture employed in the process should be at least molecularly equivalent to the number of available chlorine atoms in the polymer mixture. However, if desired, an excess of such compounds may be employed in order to insure substantially complete reaction of all the available chlorine atoms.

The following examples are submitted for the purpose of further illustrating the nature of the present invention and is not intended as a limitation on the scope thereof. Parts and percentages referred to in the examples are by weight unless otherwise indicated.

EXAMPLE 1

Preparation of [NP(O(CH$_2$CH$_2$O)$_3$C$_6$H$_4$C$_8$H$_{17}$)$_2$] Homopolymer Into a beverage bottle was charged 100 cc of anhydrous tetrahydrofuran (hereinafter THF), 8.9 gms (12.2 milliliters) of anhydrous triethylamine, 88.0 milliliters of C$_8$H$_{17}$C$_6$H$_4$(OC$_2$H$_4$)$_3$OH in THF (0.86 M), available commercially under the designation Triton ×35 from Rohm & Haas Company, 32.9 gms of a 15.5 percent total solids solution in THF of a polydichlorophosphazene polymer having a degree of polymerization of about 2600. The bottle was then capped and heated in a rotating bath at 80° C. for a total of 39 hours. The resultant polymer product was isolated by coagulation from water and vacuum dried. The polymer product had a Tg of −14° C., a Tm of 195° C. and Txtl of 155° C.

Microanalysis of the product showed: C; 55.97% H; 8.55% N; 4.00% P; 7.37% Cl; 1.97%

From this analysis, it was determined that the polymer product containing 77.95% homopolymer, 7.63% triethylamine hydrochloride (TEA) and 10.17% hydrolyzed product.

Based on this composition, the polymer product would have calculated values as follows: C; 56.00% H; 8.35% N; 4.10% P; 7.34% C; 1.97%

A film was cast from the polymer product in THF solution. The dry film had a pencil hardness of HB.

EXAMPLE 2

Preparation of [NP(O(CH$_2$CH$_2$O)$_3$C$_6$H$_4$C$_8$H$_{17}$)(OCH$_2$CF$_3$)] Copolymer Into a beverage bottle was charged 50 ml of anhydrous THF, 12.2 ml of TEA, 44.0 ml of Triton ×35, 3.4 ml of CF$_3$CH$_2$OH (trifluoroethanol) and 38.0 grams of a 12.3 total solids solution in THF of polydichlorophosphazene having a degree of polymerization of about 2600.

The reaction mixture was heated at 120° C. for 48 hours. The resultant polymer product was isolated by water coagulation and vacuum dried. Microanalysis of the polymer product showed:

C; 55.45%, H; 7.98%, N; 3.10%; P=5.54%, Cl=2.11%

Theory (for 6.9%/93.1% —OCH$_2$CF$_3$/O(OH$_2$C-H$_2$O)$_3$C$_6$H$_4$C$_8$H$_7$ copolymer, 9.6% unreacted chloropolymer, 3.19% hydrolyzed polymer and 5.9% hydrochloride salt).

C; 55.45%, H; 7.96%, N; 3.11%, P; 5.53%, Cl; 2.11%

A film of the polymer product was cast from THF solution. The dried film had a pencil hardness of <HB.

EXAMPLE 3

Preparation of [NP(O(CH$_2$CH$_2$O)$_2$C$_6$H$_5$)(OCH$_2$CF$_3$)] Copolymer

Into a 10 oz. beverage bottle was added 70 ml of anhydrous cyclohexane, 12.2 ml (8.9 grams) of anhydrous TEA, 8.1 grams (44.4 millimoles) of 2(2-phenoxyethoxy) ethanol, 3.4 ml of CF$_3$CH$_2$OH (neat), 38.2 grams of a 11.5% total solids solution in THF of polydichlorophosphazene polymer having a degree of polymerization of about 2600. The reaction mixture was polymerized at 120° C. for 48 hours. The batch was filtered and the filtered solid contained both triethylamine hydrochloride salt and polymer product. The solid product was then dissolved in methanol, dried and redissolved in toluene. Water and salt was removed in a separating funnel.

A film of the polymeric product was then cast from toluene. The dried film had a pencil hardness of HB. The product had a Tg of 26° C.

Microanalysis of the product showed: C; 38.15%, H; 4.62%, N; 6.53%, P; 10.46%, Cl; 0.19%

Theory (based on 49.8%/60.2% —OCH$_2$CF$_3$/O(CH$_2$CH$_2$O)$_2$C$_6$H$_5$ copolymer and 3.12% hydrochloride salt). C; 38.21%, H; 4.05%, N, 5.28%, P; 10.99%, Cl; 0.80%

EXAMPLE 4

Preparation of [NP(O(CH$_2$CH$_2$O)$_{9-10}$C$_6$H$_4$C$_8$H$_{17}$)$_2$] Homopolymer Into a 10 oz. bottle was added 12.2 ml (8.9 grams) of TEA, 88 ml of C$_8$H$_{17}$C$_6$H$_4$(OCH$_2$CH$_2$)$_{9-10}$OH (an alkylaryl polyether alcohol designated Triton ×100 available from Rohm & Haas Company), 37.4 grams of a 12.3% total solids solution in THF of a polydichlorophosphazene having a degree of polymerization of about 2600. The bottle was capped and then heated for 63.5 hours at 120° C. The resultant polymer mixture was filtered to remove the triethylamine hydrochloride salt. A film was cast from part of the THF filtrate and exhibited a pencil hardness of <HB. The polymer product filtrate was soluble in water and methanol and could be coagulated from hexane.

EXAMPLE 5

Preparation of [NP(OCH$_2$CH$_2$OC$_6$H$_4$C$_8$H$_{17}$)$_2$] Homopolymer

Into a 10 oz beverage bottle was charged 100 cc of anhydrous THF, 8.9 grams (12.2 ml) of anhydrous TEA, 88 ml of C$_8$H$_{17}$C$_6$H$_4$OC$_2$H$_4$OH (an alkylaryl monoether alcohol available under the designation Triton ×15 from Rohm & Haas Company) and 31.9 grams (34.3 ml) of a polydichlorophosphazene having a degree of polymerization of about 2600. The batch was polymerized at 80° C. until the P—Cl bond in the IR was essentially eliminated.

The polymer product was isolated by water coagulation and vaccum dried.

The derivatized homopolymer was soluble in acetone, hexane, toluene and chloroform, formed a cloudy suspension in methanol and was insoluble in water. The polymer product had a Tg of −45.5° C. and −66.5° C.

EXAMPLE 6

Preparation of [NP(OCH$_2$CH$_2$OCH$_3$)(OC$_6$H$_5$)] Copolymer

One hundred grams of a polydichlorophosphazene polymer in 1200 ml of benzene were added to a THF solution of sodium 2-methoxyethoxide and sodium phenoxide which was prepared from 49.6 grams of sodium salt, 100 grams of 2-methoxy ethanol and 101.4 grams of phenol in 600 ml of THF. The reaction mixture was stirred at 320° F. for 21 hours in the reactor. At the end of this time, the reaction mixture was cooled to room temperature and the polymer was coagulated with methanol. The polymer was then desalted with water by wash milling. It was then dissolved in two liters of THF and coagulated with water. The product present in 10% yield was obtained as an elastomer.

EXAMPLE 7

Preparation of [NP(OCH$_2$CH$_2$CH$_2$CH$_2$OCH$_3$)(OC$_6$H$_4$CH=CH$_2$)] Copolymer An alkoxide was first prepared by admixing 44.0 grams of sodium, 400.0 grams of 3-methoxybutanol in 1 liter of THF. The resultant mixture was heated to reflux for 4 hours. Upon cooling, 100 grams of polydichlorophosphazene polymer was added to the resultant alkoxide (i.e., sodium salt) along with 0.06207 mole of orthoallylphenol (OAP). Upon removal of NaCl, the polymer was then isolated in water.

The polymeric product was analyzed and showed a DSV of 3.17, % gel of 4.3, % Na of 0.33, % Cl of 0.36 and % OAP of 1.6% by weight.

We claim:

1. A polyphosphazene polymer containing repeating units represented by the formulas:

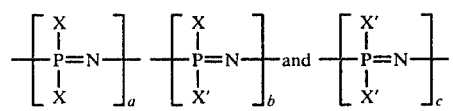

wherein X is R(OR')$_n$O— in which R is alkyl containing from 1 to 20 carbon atoms, aryl, alkylaryl or arylalkyl, R' is an alkylene radical and n is an integer from 3 to 15; wherein X' is X or is selected from the group consisting of substituted or unsubstituted alkoxy, alkenyloxy, aryloxy, alkenylaryloxy, amino and mercapto groups and wherein 20≦(a+b+c)≦50,000 per polymer.

2. The polymer of claim 1 wherein X and X' are C$_8$H$_{17}$C$_6$H$_4$(OCH$_2$CH$_2$)$_3$O—.

3. The polymer of claim 1 wherein X and X' are C$_8$H$_{17}$C$_6$H$_4$(CH$_2$CH$_2$O)$_{9-10}$O—.

4. The polymer of claim 1 wherein X is C$_8$H$_{17}$C$_6$H$_4$(OCH$_2$CH$_2$)$_3$O— and X' is CF$_3$CH$_2$O—.

5. The polymer of claim 1 wherein R is an alkylaryl radical.

6. A method for preparing a water-soluble polyphosphazene polymer containing repeating units represented by the formula:

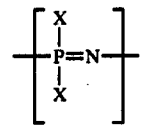

wherein X is $C_8H_{17}C_6H_4(CH_2CH_2O)_{9-10}O-$ and wherein said polymer contains from 20 to 50,000 of said units; said method comprising reacting a poly(dichlorophosphazene) having the formula $-(NPCl_2)_n-$, in which n is from 20 to 50,000, with $C_8H_{17}C_6H_4(OCH_2CH_2)_{9-10}OH$ in the presence of a tertiary amine.

7. The method of claim 6 wherein said tertiary amine is triethylamine.

* * * * *

UNITED STATES PATENT AND TRADEMARK OFFICE
CERTIFICATE OF CORRECTION

PATENT NO. : 4,258,173
DATED : March 24, 1981
INVENTOR(S) : Donald N. Schulz, Tai C. Cheng & Thomas A. Antkowiak It is certified that error appears in the above-identified patent and that said Letters Patent are hereby corrected as shown below:

Col. 5, line 41

" (DAMCO)" should read -- (DABCO) --

Col. 5, line 51

"utilizes" should read -- utilized --

Signed and Sealed this

Fourteenth Day of July 1981

[SEAL]

Attest:

GERALD J. MOSSINGHOFF

Attesting Officer

Commissioner of Patents and Trademarks